Patented July 27, 1926.

1,593,904

UNITED STATES PATENT OFFICE.

IVAN H. LASHER, ALVIN M. MOSHER, AND CLAYTON A. LASHER, OF WYMORE, NEBRASKA.

CATFISH BAIT.

No Drawing.   Application filed August 12, 1925.  Serial No. 49,822.

Our invention relates to a fish bait and has particularly in view a compound bait for cat fish, which can be made of ingredients which are cheap and can be put up in package form for sale and use.

The base and principal ingredient is ordinary cheese and added thereto are smaller amounts of wheat flour, eggs, and tankage.

The specific proportions of these ingredients which we have found to make an attractive bait are as follows: cheese, 74%; wheat flour, 15%; tankage, 6%; and eggs, 5%.

While we have found these particular proportions of ingredients most satisfactory, we reserve to ourselves the right to make such changes as fall within the spirit and scope of the appended claims.

Therefore, what we claim as new and desire to secure by Letters Patent of the United States is:

1. A fish bait comprising cheese as the principal ingredient and containing in addition thereto minor quantities of starch, fat, and protein material.

2. A fish bait comprising cheese as its principal ingredient and containing minor quantities of wheat flour, eggs, and tankage.

3. A fish bait containing food ingredients in approximately the following proportions: cheese, 74%; wheat flour, 15%; tankage 6%; and eggs 5%.

In testimony whereof we affix our signatures.

IVAN H. LASHER.
ALVIN M. MOSHER.
CLAYTON A. LASHER.